US011013266B2

(12) United States Patent  
Bless et al.

(10) Patent No.: US 11,013,266 B2  
(45) Date of Patent: May 25, 2021

(54) AEROSOL DELIVERY DEVICE SENSORY SYSTEM INCLUDING AN INFRARED SENSOR AND RELATED METHOD

(71) Applicant: RAI STRATEGIC HOLDINGS, INC., Winston-Salem, NC (US)

(72) Inventors: Alfred Bless, Asheboro, NC (US); Stephen B. Sears, Siler City, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 778 days.

(21) Appl. No.: 15/374,220

(22) Filed: Dec. 9, 2016

(65) Prior Publication Data

US 2018/0160730 A1    Jun. 14, 2018

(51) Int. Cl.
*H05B 3/78* (2006.01)
*A61M 11/04* (2006.01)
(Continued)

(52) U.S. Cl.
CPC .......... *A24F 47/008* (2013.01); *G01J 5/0014* (2013.01); *H05B 1/0244* (2013.01); *H05B 2203/021* (2013.01)

(58) Field of Classification Search
CPC .... H05B 3/78; H05B 3/82; A61M 11/04–042; A61M 15/00;
(Continued)

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 | 7/1965 |
| CA | 2 641 869 | 5/2010 |

(Continued)

OTHER PUBLICATIONS

"Infrared Thermopile Contactless Temperature Sensor in WCSP Package", Texas Instruments Incorporated, 2016, pp. 1-3, Retrieved from http://www.ti.com/product/tmp006?keyMatch=tmp006&tisearch=Search-EN-Everything, website visited Dec. 9, 2016.

(Continued)

*Primary Examiner* — Michael A Laflame, Jr.
(74) *Attorney, Agent, or Firm* — Womble Bond Dickinson (US) LLP

(57) ABSTRACT

An aerosol delivery device sensory system is provided. The system may include an outer body, an atomizer, and an infrared sensor. The atomizer, which may be received in the outer body, may include a heating element. The infrared sensor may be configured to measure infrared radiation produced by the atomizer. The infrared sensor may be located inside or outside of the outer body. In this regard, by way of example, the infrared sensor may be configured to provide feedback for control purposes, or the infrared sensor may be employed for testing purposes. A fiber optic cable may extend from the infrared sensor to a component to sense the radiation being emitted therefrom.

12 Claims, 11 Drawing Sheets

(51) Int. Cl.
  *A61M 15/06* (2006.01)
  *A24F 47/00* (2020.01)
  *G01J 5/00* (2006.01)
  *H05B 1/02* (2006.01)

(58) Field of Classification Search
  CPC ... A61M 15/0065; A61M 15/06; A24F 47/00;
       A24F 47/002; A24F 47/004; A24F 47/008
  See application file for complete search history.

(56) References Cited

U.S. PATENT DOCUMENTS

| | | |
|---|---|---|
| 2,104,266 A | 1/1938 | McCormick |
| 3,200,819 A | 8/1965 | Gilbert |
| 4,284,089 A | 8/1981 | Ray |
| 4,303,083 A | 12/1981 | Burruss, Jr. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,144,962 A | 9/1992 | Counts et al. |
| 5,169,234 A | 12/1992 | Bhm |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi et al. |
| 5,369,723 A | 11/1994 | Counts et al. |
| 5,372,148 A | 12/1994 | McCafferty et al. |
| 5,388,574 A | 2/1995 | Ingebrethsen et al. |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiring et al. |
| 5,743,251 A | 4/1998 | Howell et al. |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A | 3/1999 | Adams et al. |
| 5,894,841 A | 4/1999 | Voges |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,854,461 B2 | 2/2005 | Nichols |
| 6,854,470 B1 | 2/2005 | Pu |
| 7,117,867 B2 | 10/2006 | Cox et al. |
| 7,293,565 B2 | 11/2007 | Griffin et al. |
| 7,513,253 B2 | 4/2009 | Kobayashi et al. |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 8,127,772 B2 | 3/2012 | Montaser |
| 8,314,591 B2 | 11/2012 | Terry et al. |
| 8,365,742 B2 | 2/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| 8,851,081 B2 | 10/2014 | Fernando et al. |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0226568 A1 | 11/2004 | Takeuchi et al. |
| 2005/0016550 A1 | 1/2005 | Katase |
| 2006/0016453 A1 | 1/2006 | Kim |
| 2006/0090752 A1* | 5/2006 | Imondi ............ A61M 15/0065 128/200.24 |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0144514 A1* | 6/2007 | Yeates ............... A61M 15/0086 128/203.15 |
| 2007/0215167 A1 | 9/2007 | Crooks et al. |
| 2008/0085103 A1 | 4/2008 | Beland et al. |
| 2008/0092912 A1 | 4/2008 | Robinson et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Hon |
| 2009/0095312 A1 | 4/2009 | Herbrich et al. |
| 2009/0126745 A1 | 5/2009 | Hon |
| 2009/0188490 A1 | 7/2009 | Hon |
| 2009/0230117 A1 | 9/2009 | Fernando et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0043809 A1 | 2/2010 | Magnon |
| 2010/0083959 A1 | 4/2010 | Siller |
| 2010/0200006 A1 | 8/2010 | Robinson et al. |
| 2010/0229881 A1 | 9/2010 | Hearn |
| 2010/0242974 A1 | 9/2010 | Pan |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0186392 A1* | 7/2013 | Haartsen ............ A61M 15/0065 128/200.23 |
| 2013/0192619 A1 | 8/2013 | Tucker et al. |
| 2013/0255702 A1 | 10/2013 | Griffith, Jr. et al. |

(56) References Cited

U.S. PATENT DOCUMENTS

| | | |
|---|---|---|
| 2013/0306084 A1 | 11/2013 | Flick |
| 2013/0319439 A1 | 12/2013 | Gorelick et al. |
| 2013/0333711 A1* | 12/2013 | Liu ............... A24F 47/002 131/329 |
| 2013/0340750 A1 | 12/2013 | Thorens et al. |
| 2013/0340775 A1 | 12/2013 | Juster et al. |
| 2014/0000638 A1* | 1/2014 | Sebastian ............ A24F 47/008 131/328 |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0157583 A1 | 6/2014 | Ward et al. |
| 2014/0202474 A1 | 7/2014 | Peleg et al. |
| 2014/0209105 A1 | 7/2014 | Sears et al. |
| 2014/0253144 A1 | 9/2014 | Novak et al. |
| 2014/0261408 A1 | 9/2014 | DePiano et al. |
| 2014/0261486 A1 | 9/2014 | Potter et al. |
| 2014/0261487 A1 | 9/2014 | Chapman et al. |
| 2014/0261495 A1 | 9/2014 | Novak et al. |
| 2014/0270727 A1 | 9/2014 | Ampolini et al. |
| 2014/0270729 A1 | 9/2014 | DePiano et al. |
| 2014/0270730 A1 | 9/2014 | DePiano et al. |
| 2014/0345631 A1 | 11/2014 | Bowen et al. |
| 2015/0007838 A1 | 1/2015 | Fernando et al. |
| 2015/0053217 A1 | 2/2015 | Steingraber et al. |
| 2015/0181935 A1* | 7/2015 | Lyubomirskiy ....... A24F 47/008 392/386 |
| 2016/0037826 A1 | 2/2016 | Hearn et al. |
| 2016/0219938 A1* | 8/2016 | Mamoun ................ G05B 15/02 |
| 2017/0182267 A1* | 6/2017 | Cameron ............ A61M 11/042 |
| 2017/0196273 A1* | 7/2017 | Qiu ..................... A24F 47/008 |
| 2018/0007968 A1* | 1/2018 | Sur ..................... A24F 47/008 |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 104305527 A | 1/2015 |
| DE | 10 2006 004 484 | 8/2007 |
| DE | 102006041042 | 3/2008 |
| DE | 20 2009 010 400 | 11/2009 |
| DE | 202014101125 | 6/2014 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| GB | 1014779 | 12/1965 |
| GB | 2469850 | 11/2010 |
| JP | S63 292027 A | 11/1988 |
| WO | WO 1997/48293 | 12/1997 |
| WO | WO 2003/034847 | 5/2003 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | WO 2013/089551 | 6/2013 |
| WO | 20170162687 | 9/2017 |

OTHER PUBLICATIONS

"Noncontact Infrared Temperature Measurement", Raytek Corporation, 2016, Retrieved from http://www.raytek.com/raytek/en-r0, website visited Dec. 9, 2016.

"Infrared Temperature Measurement Instruments", OMEGA Engineering Inc., 2016, Retrieved from http://www.omega.com/section/infrared-temperature-measurement.html, website visited Dec. 9, 2016.

"TMP006/B Infrared Thermopile Sensor in Chip-Scale Package", Texas Instruments Incorporated, May 2011, pp. 1-38, Revised Apr. 2015, Retrieved from http://www.ti.com/lit/ds/symlink/tmp006.pdf, website visited Dec. 9, 2016.

"Infrared sensors for non contact temperature measurement", Micro-Epsilon, 2016, pp. 1-4, Retrieved from http://www.micro-epsilon.com/temperature-sensors/index.html, website visited Dec. 9, 2016.

International Search Report dated Feb. 20, 2018 in corresponding International Application No. PCT/IB2017/057760 filed Dec. 8, 2017.

* cited by examiner

AEROSOL DELIVERY DEVICE SENSORY SYSTEM INCLUDING AN INFRARED SENSOR AND RELATED METHOD

FIELD OF THE DISCLOSURE

The present disclosure relates to aerosol delivery devices such as electronic cigarettes and more particularly to aerosol delivery devices including an atomizer. The atomizer may be configured to heat an aerosol precursor composition, which may be made or derived from tobacco or otherwise incorporate tobacco, to form an inhalable substance for human consumption.

BACKGROUND

Many devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous alternative smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., and U.S. Pat. App. Pub. No. 2015/0059780 to Davis et al., which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et al., which are incorporated by reference in their entireties.

However, it may be desirable to monitor conditions within aerosol delivery devices during operation thereof. Thus, advances with respect to sensors for aerosol delivery devices may be desirable.

BRIEF SUMMARY OF THE DISCLOSURE

The present disclosure relates to aerosol delivery devices configured to produce aerosol and which aerosol delivery devices, in some embodiments, may be referred to as electronic cigarettes. In one aspect, an aerosol delivery device sensory system is provided. The aerosol delivery device sensory system may include an outer body. Further, the aerosol delivery device sensory system may include an atomizer including a heating element and received in the outer body. The aerosol delivery device sensory system may additionally include an infrared sensor. The infrared sensor may be configured to measure infrared radiation produced by the atomizer.

In some embodiments the aerosol delivery device sensory system may further include a fiber optic cable having a first end positioned proximate the infrared sensor and a second end positioned proximate the atomizer. The infrared sensor may be configured to measure infrared radiation received from the atomizer through the fiber optic cable. The aerosol delivery device sensory system may additionally include a shielding device coupled to the infrared sensor and extending about a sensor aperture defined by the infrared sensor. The first end of the fiber optic cable may be coupled to the shielding device. The shielding device may be substantially entirely enclosed when engaged with the first end of the fiber optic cable and the infrared sensor to substantially prevent infrared radiation that has not traversed the fiber optic cable from entering the sensor aperture. The fiber optic cable may include a shield layer configured to substantially prevent infrared radiation from entering the fiber optic cable at locations other than the second end.

In some embodiments, the infrared sensor may be received in the outer body. The aerosol delivery device sensory system may include an aerosol delivery device. The aerosol delivery device sensory system may further include a controller configured to control electrical current supplied to the atomizer in response to a signal from the infrared sensor. The aerosol delivery device sensory system may further include an electronic component and an electrical power source. The electronic component may be positioned in a cartridge. The electrical power source and the controller may be positioned in a control body configured to releasably engage the cartridge. The electrical power source may be in communication with the controller when the cartridge is engaged with the control body. The controller may receive the signal from the infrared sensor via the electronic component.

In some embodiments the infrared sensor may be positioned outside of the outer body. The aerosol delivery device sensory system may include a temperature testing unit including the infrared sensor and an aerosol delivery device including the outer body and the atomizer.

In an additional aspect, an aerosol delivery device temperature monitoring method is provided. The method may include providing an outer body and an atomizer including a heating element. The atomizer may be received in the outer body. The method may further include providing an infrared sensor. Additionally, the method may include measuring infrared radiation produced by the atomizer with the infrared sensor.

In some embodiments the method may further include positioning a first end of a fiber optic cable proximate the infrared sensor. The method may additionally include positioning a second end of the fiber optic cable proximate the atomizer. Measuring infrared radiation produced by the atomizer with the infrared sensor may include measuring infrared radiation received from the atomizer through the fiber optic cable.

In some embodiments the method may further include coupling a shielding device to the sensor assembly such that the shielding device extends about a sensor aperture defined by the infrared sensor. Further, the method may include coupling the shielding device to the first end of the fiber optic cable. Coupling the shielding device to the sensor assembly and the first end of the fiber optic cable may include substantially entirely enclosing the shielding device to substantially prevent infrared radiation from entering the sensor aperture that has not traversed the fiber optic cable. Additionally, the method may include substantially preventing infrared radiation from entering the fiber optic cable at locations other than the second end with a shield layer.

In some embodiments the method may further include positioning the infrared sensor in the outer body. Measuring infrared radiation produced by the atomizer with the infrared sensor may include controlling electrical current supplied to the atomizer in response to a signal from the infrared sensor. The method may additionally include providing a controller. Controlling electrical current supplied to the atomizer in response to the signal from the infrared sensor may include controlling the electrical current supplied to the atomizer with the controller.

In some embodiments the method may additionally include positioning the infrared sensor outside of the outer body. Positioning a second end of the fiber optic cable proximate the atomizer may include inserting the fiber optic cable into the outer body.

These and other features, aspects, and advantages of the disclosure will be apparent from a reading of the following detailed description together with the accompanying drawings, which are briefly described below.

BRIEF DESCRIPTION OF THE DRAWINGS

Figure 1:
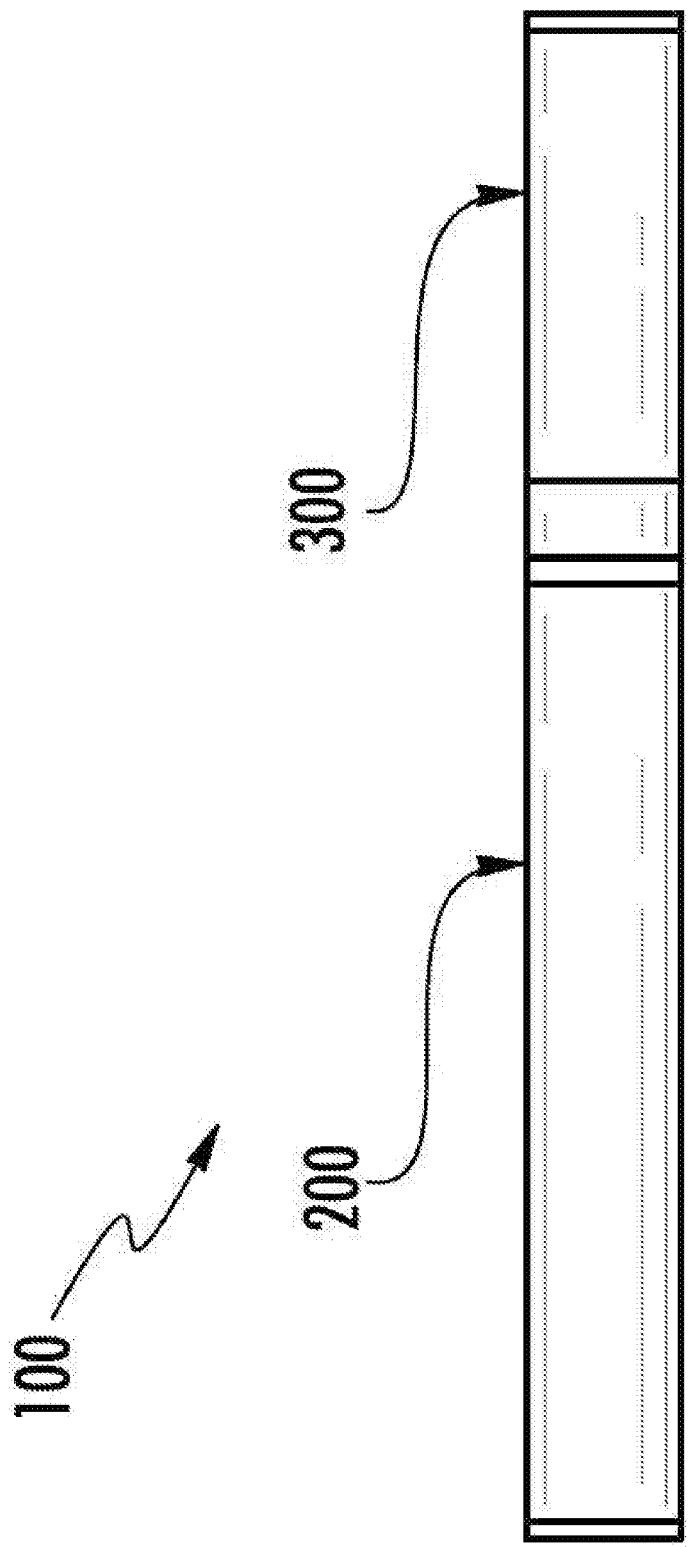
Figure 2:
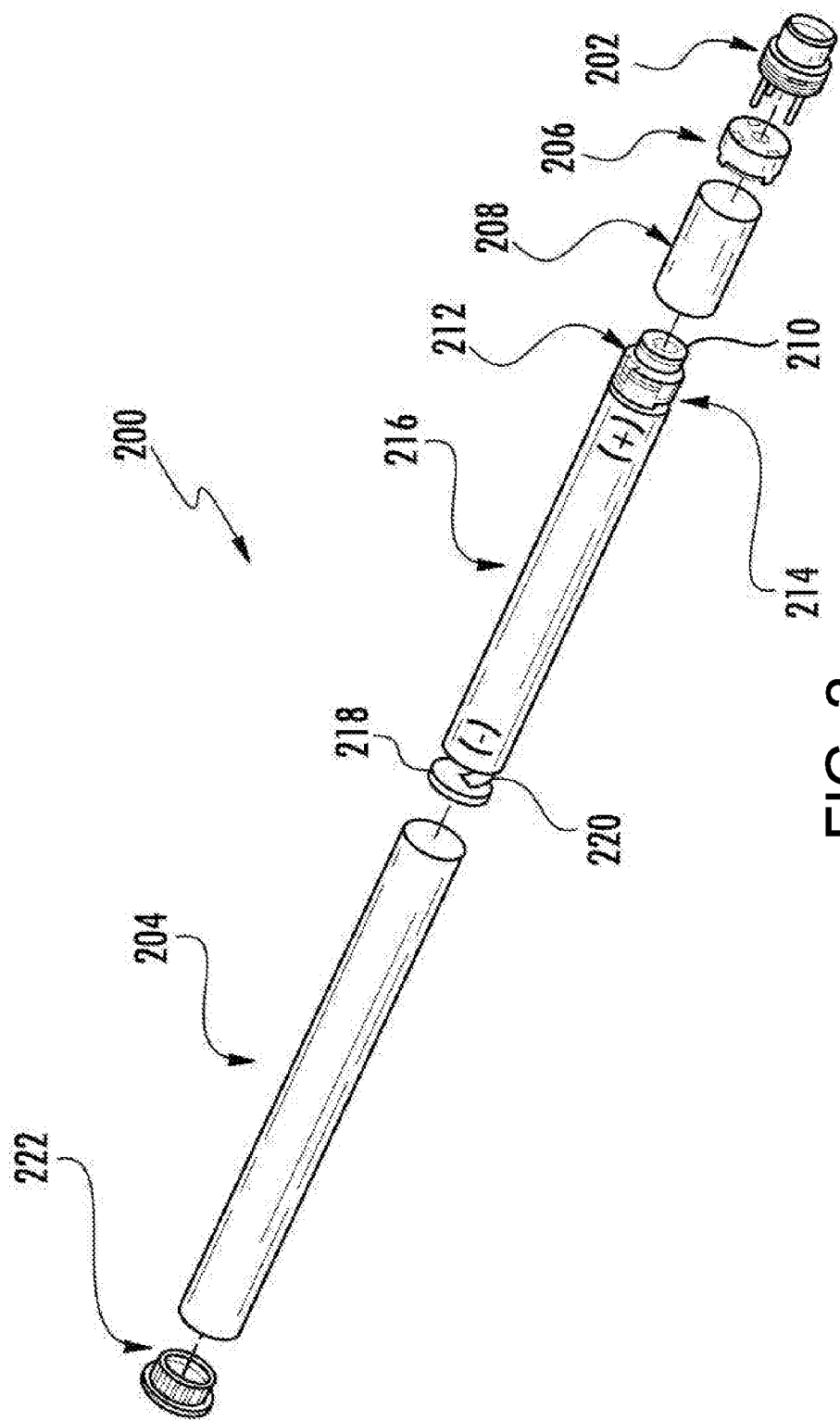
Figure 3:
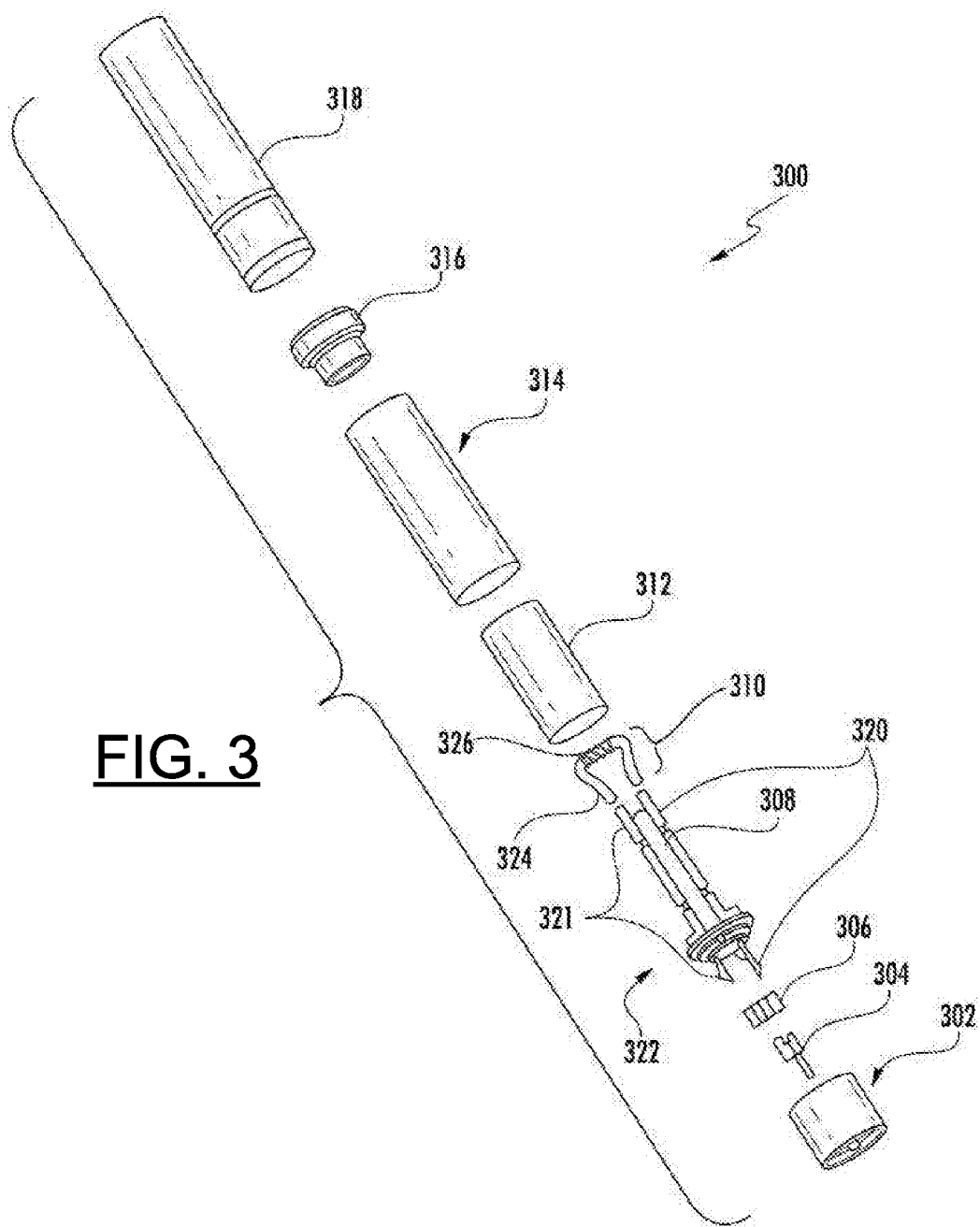
Figure 4:
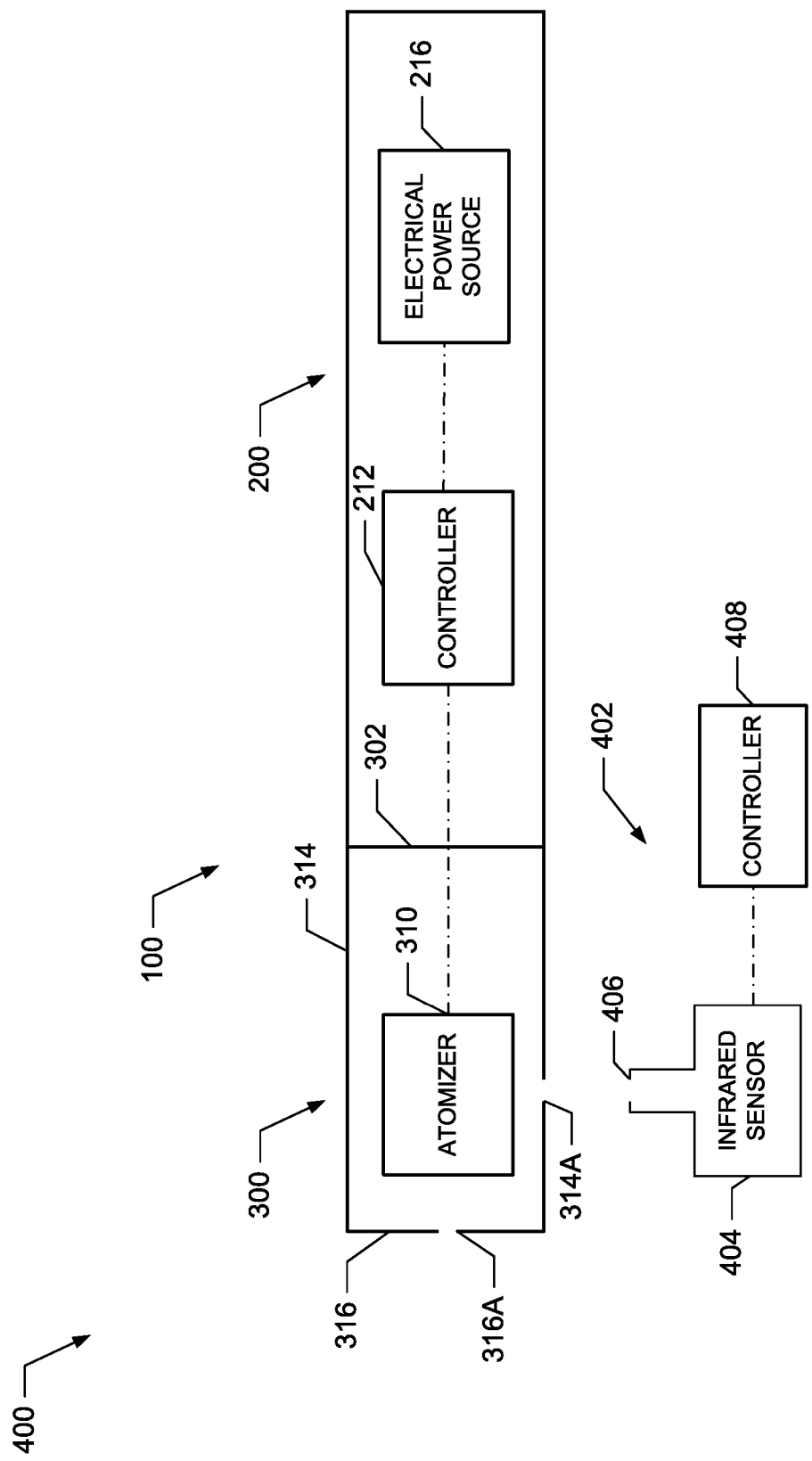
Figure 5:
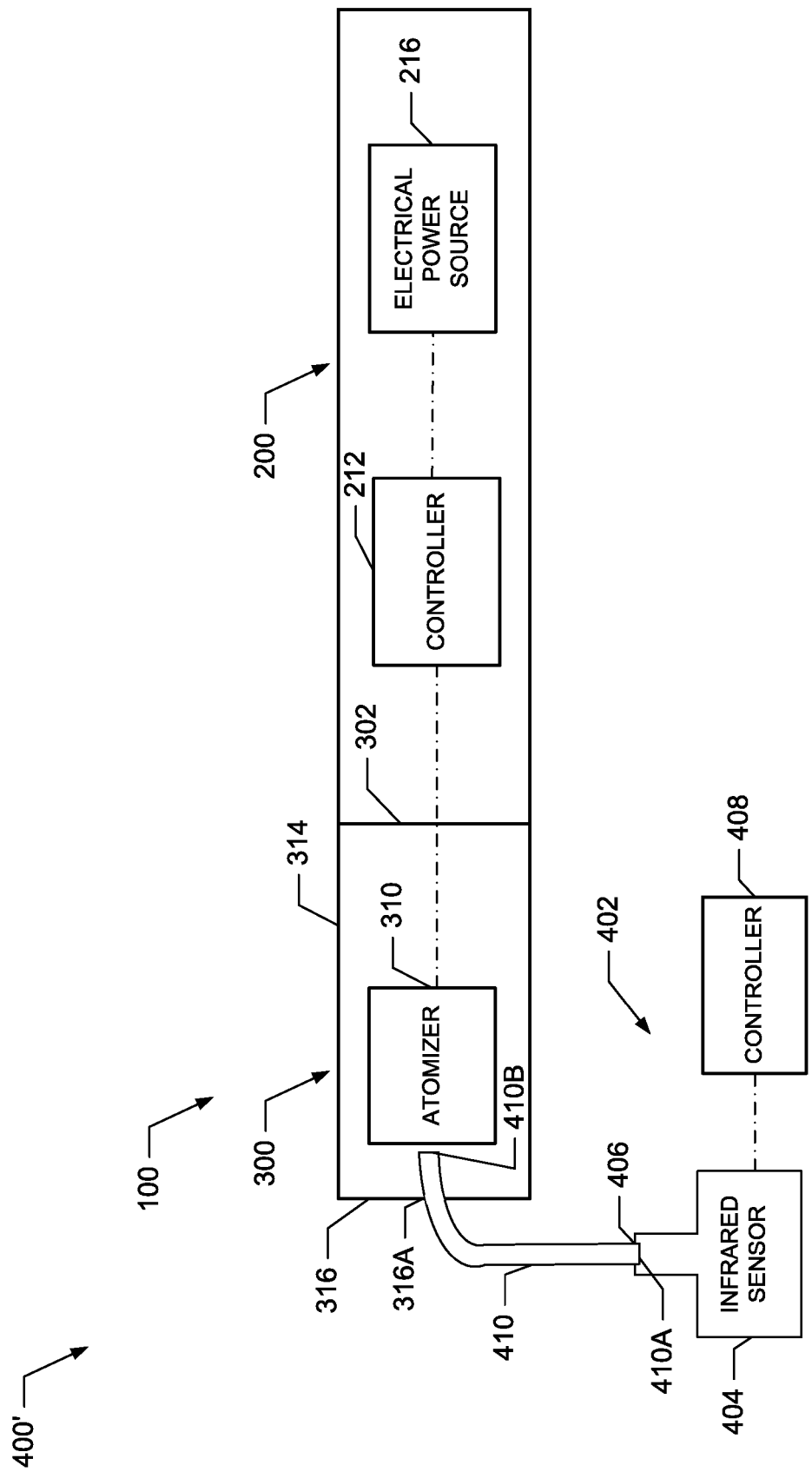
Figure 6A:
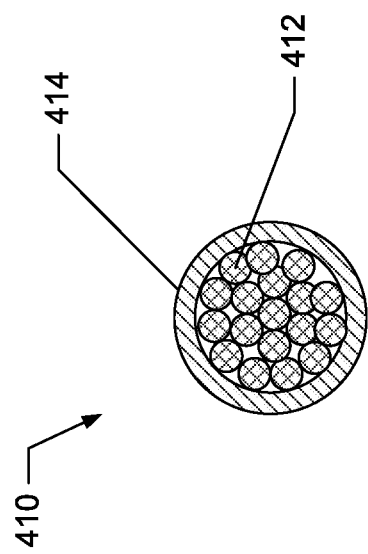
Figure 6B:
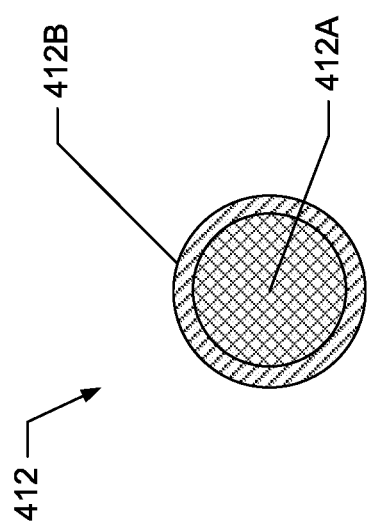
Figure 7:
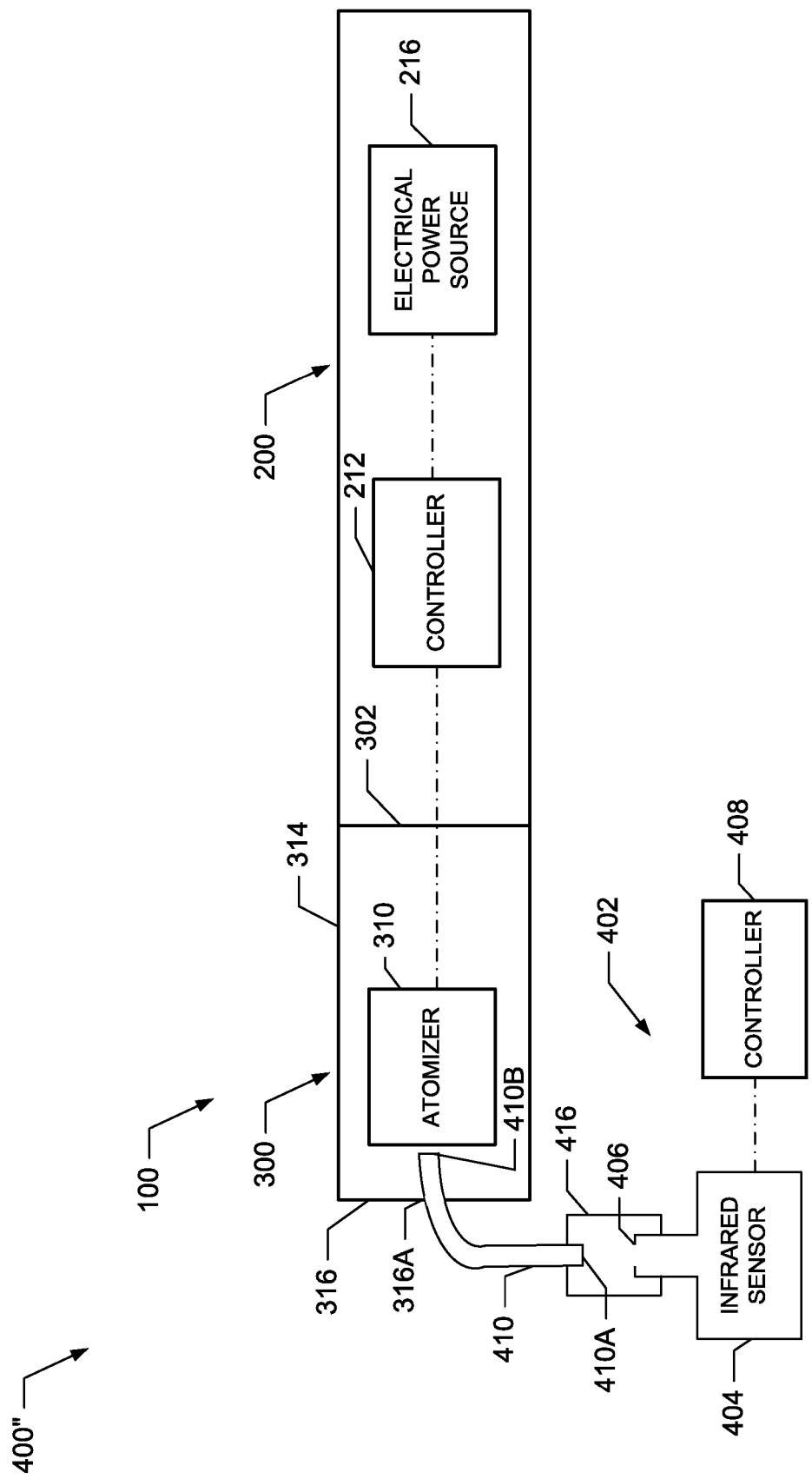
Figure 8:
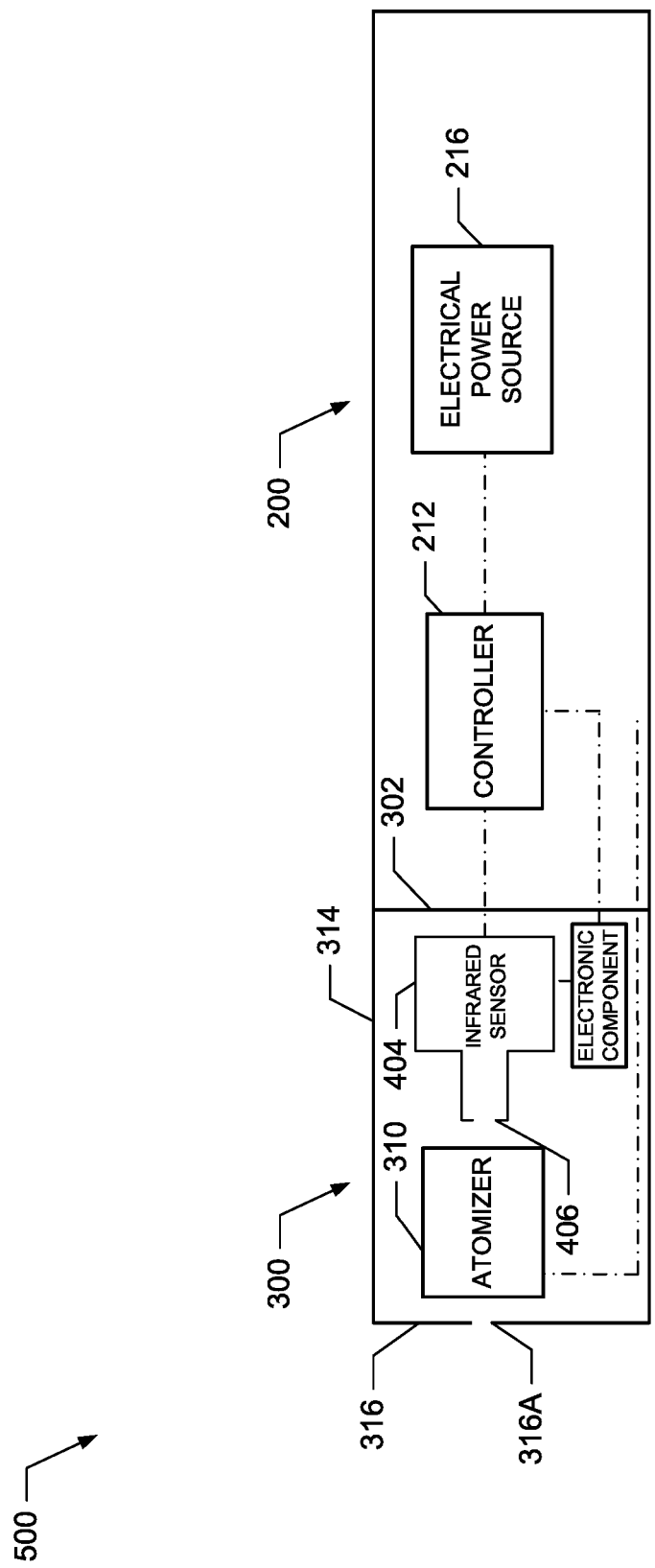
Figure 9:
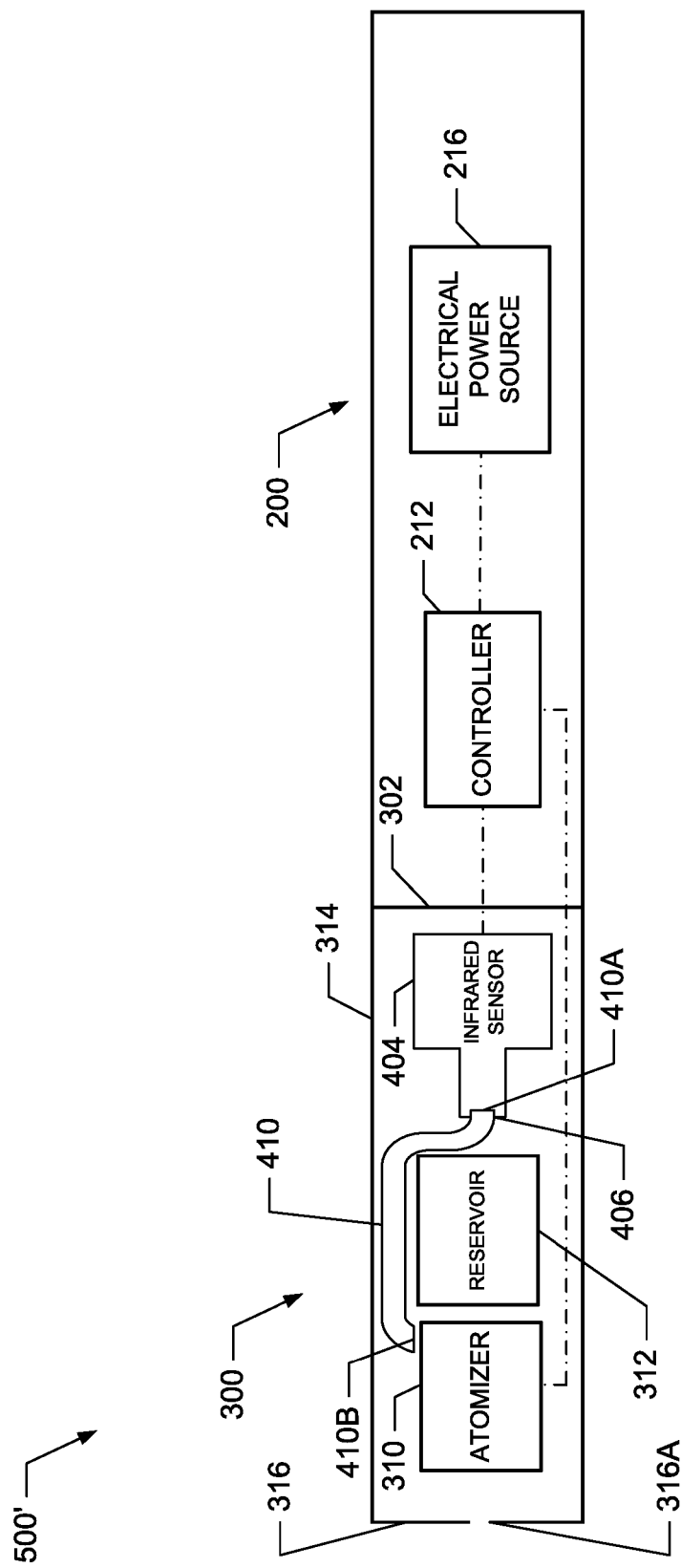
Figure 10:
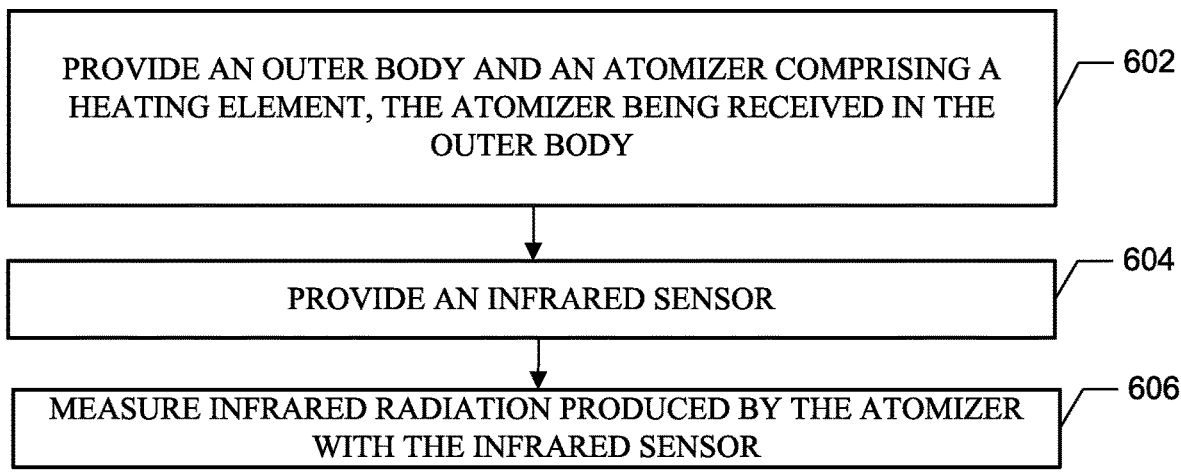

Having thus described the disclosure in the foregoing general terms, reference will now be made to the accompanying drawings, which are not necessarily drawn to scale, and wherein:

FIG. 1 illustrates a side view of an aerosol delivery device comprising a cartridge and a control body according to an example embodiment of the present disclosure;

FIG. 2 illustrates the control body of FIG. 1 in an exploded configuration according to an example embodiment of the present disclosure;

FIG. 3 illustrates the cartridge of FIG. 1 in an exploded configuration according to an example embodiment of the present disclosure;

FIG. 4 schematically illustrates an aerosol delivery device sensory system including an external infrared sensor according to an example embodiment of the present disclosure;

FIG. 5 schematically illustrates an aerosol delivery device sensory system including an external infrared sensor and a fiber optic cable according to an example embodiment of the present disclosure;

FIG. 6A illustrates a sectional view through the fiber optic cable of FIG. 5 according to an example embodiment of the present disclosure;

FIG. 6B illustrates a sectional view an optical fiber of the fiber optic cable of FIG. 6A according to an example embodiment of the present disclosure;

FIG. 7 schematically illustrates an aerosol delivery device sensory system including an external infrared sensor, a shielding device, and a fiber optic cable according to an example embodiment of the present disclosure;

FIG. 8 schematically illustrates an aerosol delivery device sensory system including an internal infrared sensor according to an example embodiment of the present disclosure;

FIG. 9 schematically illustrates an aerosol delivery device sensory system including an internal infrared sensor and a fiber optic cable according to an example embodiment of the present disclosure; and FIG. 10 schematically illustrates an aerosol delivery device temperature monitoring method according to an example embodiment of the present disclosure.

DETAILED DESCRIPTION OF THE DISCLOSURE

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

The present disclosure provides descriptions of aerosol delivery devices. The aerosol delivery devices may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device, although in other embodiments the aerosol may not be visible. In highly preferred embodiments, aerosol delivery devices may incorporate tobacco and/or components derived from tobacco. As such, the aerosol delivery device can be characterized as an electronic smoking article such as an electronic cigarette or "e-cigarette."

While the systems are generally described herein in terms of embodiments associated with aerosol delivery devices such as so-called "e-cigarettes," it should be understood that the mechanisms, components, features, and methods may be embodied in many different forms and associated with a variety of articles. For example, the description provided herein may be employed in conjunction with embodiments of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of embodiments relating to aerosol delivery devices by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer shell or body. The overall design of the outer shell or body can vary, and the format or configuration of the outer body that can define the overall size and shape of the aerosol delivery device can vary. Typically, an elongated body resembling the shape of a cigarette or cigar can be a formed from a single, unitary shell; or the elongated body can be formed of two or more separable pieces. For example, an aerosol delivery device can comprise an elongated shell or body that can be substantially tubular in shape and, as such, resemble the shape of a conventional cigarette or cigar. However, various other shapes and configurations may be employed in other embodiments (e.g., rectangular or fob-shaped).

In one embodiment, all of the components of the aerosol delivery device are contained within one outer body or shell. Alternatively, an aerosol delivery device can comprise two or more shells that are joined and are separable. For example, an aerosol delivery device can possess at one end a control body comprising a shell containing one or more reusable components (e.g., a rechargeable battery and various electronics for controlling the operation of that article), and at the other end and removably attached thereto a shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various aerosol delivery device designs and component arrangements can be appreciated upon consideration of the commercially available electronic aerosol delivery devices.

Aerosol delivery devices of the present disclosure most preferably comprise some combination of a power source (i.e., an electrical power source), at least one controller (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw).

Alignment of the components within the aerosol delivery device of the present disclosure can vary. In specific embodiments, the aerosol precursor composition can be located near an end of the aerosol delivery device which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device may incorporate a battery or other electrical power source (e.g., a capacitor) to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices. Examples of commercial manufacturers and commercially available products, for which the components thereof, methods of operation thereof, materials included therein, and/or other attributes thereof may be included in the devices of the present disclosure are described in U.S. patent application Ser. No. 15/222,615, filed Jul. 28, 2016, to Watson et al., which is incorporated herein by reference in its entirety.

One example embodiment of an aerosol delivery device 100 is illustrated in FIG. 1. In particular, FIG. 1 illustrates an aerosol delivery device 100 including a control body 200 and a cartridge 300. The control body 200 and the cartridge 300 can be permanently or detachably aligned in a functioning relationship. Various mechanisms may connect the cartridge 300 to the control body 200 to result in a threaded engagement, a press-fit engagement, an interference fit, a magnetic engagement, or the like. The aerosol delivery device 100 may be substantially rod-like, substantially tubular shaped, or substantially cylindrically shaped in some embodiments when the cartridge 300 and the control body 200 are in an assembled configuration. However, as noted above, various other configurations such as rectangular or fob-shaped may be employed in other embodiments. Further, although the aerosol delivery devices are generally described herein as resembling the size and shape of a traditional smoking article, in other embodiments differing configurations and larger capacity reservoirs, which may be referred to as "tanks," may be employed.

In specific embodiments, one or both of the cartridge 300 and the control body 200 may be referred to as being disposable or as being reusable. For example, the control body 200 may have a replaceable battery or a rechargeable battery and/or capacitor and thus may be combined with any type of recharging technology, including connection to a typical alternating current electrical outlet, connection to a car charger (i.e., cigarette lighter receptacle), and connection to a computer, such as through a universal serial bus (USB) cable. Further, in some embodiments the cartridge 300 may comprise a single-use cartridge, as disclosed in U.S. Pat. No. 8,910,639 to Chang et al., which is incorporated herein by reference in its entirety.

FIG. 2 illustrates an exploded view of the control body 200 of the aerosol delivery device 100 (see, FIG. 1) according to an example embodiment of the present disclosure. As illustrated, the control body 200 may comprise a coupler 202, an outer body 204, a sealing member 206, an adhesive member 208 (e.g., KAPTON® tape), a flow sensor 210 (e.g., a puff sensor or pressure switch), a controller 212, a spacer 214, an electrical power source 216 (e.g., a capacitor and/or a battery, which may be rechargeable), a circuit board with an indicator 218 (e.g., a light emitting diode (LED)), a connector circuit 220, and an end cap 222. Examples of electrical power sources are described in U.S. Pat. App. Pub. No. 2010/0028766 by Peckerar et al., the disclosure of which is incorporated herein by reference in its entirety.

With respect to the flow sensor 210, representative current regulating components and other current controlling components including various microcontrollers, sensors, and switches for aerosol delivery devices are described in U.S. Pat. No. 4,735,217 to Gerth et al.; U.S. Pat. Nos. 4,922,901; 4,947,874; and 4,947,875; all to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; and U.S. Pat. No. 8,205,622 to Pan, all of which are incorporated herein by reference in their entireties. Reference also is made to the control schemes described in U.S. Pat. No. 9,423,152 to Ampolini et al., which is incorporated herein by reference in its entirety.

In one embodiment the indicator 218 may comprise one or more light emitting diodes. The indicator 218 can be in communication with the controller 212 through the connector circuit 220 and be illuminated, for example, during a user drawing on a cartridge coupled to the coupler 202, as detected by the flow sensor 210. The end cap 222 may be adapted to make visible the illumination provided thereunder by the indicator 218. Accordingly, the indicator 218 may be illuminated during use of the aerosol delivery device 100 to simulate the lit end of a smoking article. However, in other embodiments the indicator 218 can be provided in varying numbers and can take on different shapes and can even be an opening in the outer body (such as for release of sound when such indicators are present).

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; and U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; WO 2010/091593 to Hon; and WO 2013/089551 to Foo, each of which is incorporated herein by reference in its entirety. A variety of the materials disclosed by the foregoing documents may be incorporated into the present devices in various embodiments, and all of the foregoing disclosures are incorporated herein by reference in their entireties.

FIG. 3 illustrates the cartridge 300 of the aerosol delivery device 100 (see, FIG. 1) in an exploded configuration. As illustrated, the cartridge 300 may comprise a base 302, a electronic component terminal 304, an electronic component 306 such as a printed circuit board (PCB), a flow director 308, an atomizer 310, a reservoir 312 (e.g., a reservoir substrate), an outer body 314, a mouthpiece 316, a label 318, and first and second heating terminals 320, 321 according to an example embodiment of the present disclosure.

In some embodiments the first and second heating terminals 320, 321 may be embedded in, or otherwise coupled to, the flow director 308. For example, the first and second heating terminals 320, 321 may be insert molded in the flow director 308. Accordingly, the flow director 308 and the first and second heating terminals are collectively referred to herein as a flow director assembly 322. Additional description with respect to the first and second heating terminals 320, 321 and the flow director 308 is provided in U.S. Pat. Pub. No. 2015/0335071 to Brinkley et al., which is incorporated herein by reference in its entirety.

The atomizer 310 may comprise a liquid transport element 324 and a heating element 326. The cartridge may additionally include a base shipping plug engaged with the base and/or a mouthpiece shipping plug engaged with the mouthpiece in order to protect the base and the mouthpiece and prevent entry of contaminants therein prior to use as disclosed, for example, in U.S. Pat. No. 9,220,302 to Depiano et al., which is incorporated herein by reference in its entirety.

The base 302 may be coupled to a first end of the outer body 314 and the mouthpiece 316 may be coupled to an opposing second end of the outer body to substantially or fully enclose other components of the cartridge 300 therein. For example, the electronic component terminal 304, the electronic component 306, the flow director 308, the atomizer 310, and the reservoir 312 may be substantially or entirely retained within the outer body 314. The label 318 may at least partially surround the outer body 314, and optionally the base 302, and include information such as a product identifier thereon. The base 302 may be configured to engage the coupler 202 of the control body 200 (see, e.g., FIG. 2). In some embodiments the base 302 may comprise anti-rotation features that substantially prevent relative rotation between the cartridge and the control body as disclosed in U.S. Pat. App. Pub. No. 2014/0261495 to Novak et al., which is incorporated herein by reference in its entirety.

The reservoir 312 may be configured to hold an aerosol precursor composition. Representative types of aerosol precursor components and formulations are also set forth and characterized in U.S. Pat. No. 7,726,320 to Robinson et al., U.S. Pat. No. 8,881,737 to Collett et al., and U.S. Pat. No. 9,254,002 to Chong et al.; and U.S. Pat. Pub. Nos. 2013/0008457 to Zheng et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC. Embodiments of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al; U.S. Pat. No. 8,627,828 to Strickland et al.; and U.S. Pat. No. 9,307,787 to Sun et al.; as well as US Pat. Pub. No. 2010/0018539 to Brinkley et al.; and PCT WO 97/06786 to Johnson et al., all of which are incorporated by reference herein. Additional description with respect to embodiments of aerosol precursor compositions, including description of tobacco or components derived from tobacco included therein, is provided in U.S. patent application Ser. Nos. 15/216,582 and 15/216,590, each filed Jul. 21, 2016 and each to Davis et al., which are incorporated herein by reference in their entireties.

As illustrated in FIG. 3, the reservoir 312 may comprise a plurality of layers of nonwoven fibers formed into the shape of a tube encircling the interior of the outer body 314 of the cartridge 300. Thus, liquid components, for example, can be sorptively retained by the reservoir 312. The reservoir 312 is in fluid connection with the liquid transport element 324. Thus, the liquid transport element 324 may be configured to transport liquid from the reservoir 312 to the heating element 326 via capillary action or other liquid transport mechanism. In further embodiments, the reservoir 312 may be in the form of a container formed of walls that are substantially impermeable to the e-liquid. See, for example, containers as described in U.S. Pat. App. Pub. No. 2015/0144145 to Chang et al., which is incorporated herein by reference in its entirety. In other embodiments, the cartridge 300 may be substantially replaced with a tank-style component wherein e-liquid may be stored in an annular space between an outer wall of the tank and an inner flow tube through the tank. Exemplary devices are described in U.S. patent application Ser. No. 15/202,947, filed Jul. 6, 2016, which is incorporated here by reference in its entirety.

As illustrated in FIG. 3, the liquid transport element 324 may be in direct contact with the heating element 326. As further illustrated in FIG. 3, the heating element 326 may comprise a wire defining a plurality of coils wound about the liquid transport element 324. In some embodiments the heating element 326 may be formed by winding the wire about the liquid transport element 324 as described in U.S. Pat. No. 9,210,738 to Ward et al., which is incorporated herein by reference in its entirety. Further, in some embodiments the wire may define a variable coil spacing, as described in U.S. Pat. No. 9,277,770 to DePiano et al., which is incorporated herein by reference in its entirety. Various embodiments of materials configured to produce heat when electrical current is applied therethrough may be employed to form the heating element 326. Example materials from which the wire coil may be formed include Kanthal (Fe-CrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic).

However, various other embodiments of methods may be employed to form the heating element 326, and various other embodiments of heating elements may be employed in the atomizer 310. For example, a stamped heating element may be employed in the atomizer, as described in U.S. Pat. App. Pub. No. 2014/0270729 to DePiano et al., which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, chemical heating may be employed in other embodiments. Various additional examples of heaters and materials employed to form heaters are described in U.S. Pat. No. 8,881,737 to Collett et al., which is incorporated herein by reference, as noted above.

A variety of heater components may be used in the present aerosol delivery device. In various embodiments, one or more microheaters or like solid state heaters may be used. Microheaters and atomizers incorporating microheaters suitable for use in the presently disclosed devices are described in U.S. Pat. No. 8,881,737 to Collett et al., which is incorporated herein by reference in its entirety.

The first heating terminal 320 and the second heating terminal 321 (e.g., negative and positive heating terminals) are configured to engage opposing ends of the heating element 326 and to form an electrical connection with the control body 200 (see, e.g., FIG. 2) when the cartridge 300 is connected thereto. Further, when the control body 200 is coupled to the cartridge 300, the electronic component 306 may form an electrical connection with the control body through the electronic component terminal 304. The control body 200 may thus employ the controller 212 (see, FIG. 2) to determine whether the cartridge 300 is genuine, control the direction of electrical current to the cartridge 300, and/or perform other functions. Further, various examples of electronic components and functions performed thereby are described in U.S. Pat. App. Pub. No. 2014/0096781 to Sears et al., which is incorporated herein by reference in its entirety.

During use, a user may draw on the mouthpiece 316 of the cartridge 300 of the aerosol delivery device 100 (see, FIG. 1). This may pull air through an opening in the control body 200 (see, e.g., FIG. 2) or in the cartridge 300. For example, in one embodiment an opening may be defined between the coupler 202 and the outer body 204 of the control body 200 (see, e.g., FIG. 2), as described in U.S. Pat. No. 9,220,302 to DePiano et al., which is incorporated herein by reference in its entirety. However, the flow of air may be received through other parts of the aerosol delivery device 100 in other embodiments. As noted above, in some embodiments the cartridge 300 may include the flow director 308. The flow director 308 may be configured to direct the flow of air received from the control body 200 to the heating element 326 of the atomizer 310.

A sensor in the aerosol delivery device 100 (e.g., the flow sensor 210 in the control body 200; see, FIG. 2) may sense the puff. When the puff is sensed, the control body 200 may direct current to the heating element 326 through a circuit including the first heating terminal 320 and the second heating terminal 321. Accordingly, the heating element 326 may vaporize the aerosol precursor composition directed to an aerosolization zone from the reservoir 312 by the liquid transport element 324. Thus, the mouthpiece 326 may allow passage of air and entrained vapor (i.e., the components of the aerosol precursor composition in an inhalable form) from the cartridge 300 to a consumer drawing thereon.

Various other details with respect to the components that may be included in the cartridge 300 are provided, for example, in U.S. Pat. App. Pub. No. 2014/0261495 to DePiano et al., which is incorporated herein by reference in its entirety. Additional components that may be included in the cartridge 300 and details relating thereto are provided, for example, in U.S. Pat. Pub. No. 2015/0335071 to Brinkley et al., which is incorporated herein by reference in its entirety.

Various components of an aerosol delivery device according to the present disclosure can be chosen from components described in the art and commercially available. Reference is made for example to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety.

In another embodiment substantially the entirety of the cartridge may be formed from one or more carbon materials, which may provide advantages in terms of biodegradability and absence of wires. In this regard, the heating element may comprise carbon foam, the reservoir may comprise carbonized fabric, and graphite may be employed to form an electrical connection with the power source and the controller. An example embodiment of a carbon-based cartridge is provided in U.S. Pat. App. Pub. No. 2013/0255702 to Griffith et al., which is incorporated herein by reference in its entirety.

Thus, as described above, the aerosol delivery device 100 (see, FIG. 1) may employ the atomizer 310 to produce heat and atomize an aerosol precursor composition retained in a reservoir 312. As further described above, the controller 212 (see, FIG. 2) may control the flow of current from the electrical power source 216 (see, FIG. 2) to the atomizer 310 in response to a signal from the flow sensor 210 (see, FIG. 2) indicative of a draw on the aerosol delivery device. However, it may be desirable to monitor conditions within the aerosol delivery device 100 in other manners during development of the aerosol delivery device and/or during normal use thereof.

In this regard, FIG. 4 illustrates an aerosol delivery device sensory system 400 according to an example embodiment of the present disclosure. As illustrated, the aerosol delivery device sensory system 400 may include an aerosol delivery device, such as the above-described aerosol delivery device 100, or a portion thereof, such as just the cartridge 300. As schematically illustrated, the cartridge 300 of the aerosol delivery device 100 may include the atomizer 310 received in the outer body 314. Thus, by way of example, the atomizer 310 may include the heating element 326 and the liquid transport element 324 (see, FIG. 3).

Further, the aerosol delivery device sensory system 400 may include a temperature testing unit 402. The temperature testing unit 402 may include an infrared sensor 404. The infrared sensor 404 may be configured to measure infrared radiation. Thereby, for example, the infrared sensor 404 may be configured to measure infrared radiation produced by the atomizer 310. An example embodiment of an infrared sensor is disclosed in U.S. Pat. No. 5,169,234 to Böhm et al., which is incorporated herein by reference in its entirety. Further, infrared sensors are commercially available from RAYTEK Corporation of Santa Cruz, Calif.; OMEGA ENGINEERING of Norwalk, Conn., and MICRO-EPSILON MESSTECHNIK GmbH & Co. KG of Ortenburg, Germany.

As may be understood, the infrared radiation detected by the infrared sensor 404 may be received directly from the atomizer 310 or received indirectly from atomizer via other components of the aerosol delivery device 100 heated by the atomizer. As such, the infrared sensor 404 may be aimed or otherwise configured as desired to receive infrared radiation from one or more components of the aerosol delivery device 100.

In this regard, the infrared sensor 404 may define a sensor aperture 406. Thereby, the sensor aperture 406 may be aimed at the component(s) for which a measurement of the infrared radiation radiating therefrom is desired. For example, in the illustrated embodiment, the sensor aperture 406 is aimed at the atomizer 310. Thereby, the infrared sensor 404 may detect infrared radiation received directly from the atomizer 310. Further, in some embodiments the infrared sensor may be particularly directed at a component of the atomizer 310, such as the heating element 326 or the liquid transport element 324 (see, FIG. 3) to determine how much heat is radiating from that particular portion of the atomizer. Alternatively, as noted above, the infrared sensor 404 may be aimed at one or more other components of the aerosol delivery device 100 that may be heated by the atomizer 310.

In order to detect infrared radiation emitting from a component within an outer body of the aerosol delivery device 100 (e.g., within the outer body 314 of the cartridge 300), in embodiments in which the infrared sensor 404 is positioned external to (i.e., partially or completely outside of) the aerosol delivery device 100, the infrared sensor may sense infrared radiation emitted through an aperture defined in the aerosol delivery device. In some embodiments the aerosol delivery device 100 may include one or more preexisting apertures that align with one or more internal components thereof. For example, the mouthpiece 316 may include a throughhole 316A which may align with some of the internal components of the aerosol delivery device. However, other components may not directly align with a preexisting aperture in the aerosol delivery device 100. As such, it may be necessary to form an aperture in the aerosol delivery device 100 to provide access to one or more components for which sensing of infrared radiation emitting therefrom is desired. For example, as illustrated, an aperture 314A may be formed (e.g., drilled) in the outer body 314 of the cartridge 300.

Accordingly, the infrared sensor 404 may detect infrared radiation emitted through an aperture such as the aperture 314A. Thereby, a signal produced by the infrared sensor 404 may correspond to the infrared radiation received. In some embodiments the temperature testing unit 402 may further comprise a controller 408. The controller 408 may be configured to receive the signal from the infrared sensor 404 corresponding to infrared radiation received from one or more components of the aerosol delivery device 100, which the controller may then convert to a temperature reading. Accordingly, the temperature of one or more of the components of the aerosol delivery device 100 may be monitored and/or recorded such that operational parameters of the aerosol delivery device may be adjusted and/or components thereof may be designed or redesigned to accommodate the temperature conditions.

However, infrared radiation may travel in a substantially straight path. In this regard, infrared radiation radiates from a given source. Therefore, it may be difficult or impossible to receive infrared radiation from some of the components within the aerosol delivery device 100 that are remotely located therein and/or surrounded by other components. Further, in some embodiments the outer body 314 may define a tubular configuration and the ends thereof may be partially enclosed by the mouthpiece 316 and the base 302. Thus, direct access to most internal components of the aerosol delivery device 100 may require altering the aerosol delivery device such as by drilling holes in the outer body thereof and/or otherwise deconstructing and/or modifying the components. Further, as a result of the modifications required for testing, the infrared radiation monitored under the test conditions may not be reflective of actual use conditions associated with the aerosol delivery device. Additionally, as noted above, it may not be possible to provide a direct clear path between the infrared sensor 404 and each of the components of the aerosol delivery device 100 such that infrared radiation emitting therefrom may not be received through the sensor aperture 406 and thereby the infrared sensor may not be able to monitor the infrared radiation emitted from each of the components of the aerosol delivery device 100. As such, it may be desirable to provide the aerosol delivery device sensory system with additional features configured to address the above-noted problems with regard to "line-of-sight" sensory capabilities of the infrared sensor.

In this regard, FIG. 5 illustrates an embodiment of the aerosol delivery device sensory system 400' that is substantially similar to the aerosol delivery device sensory system of FIG. 4. However, the aerosol delivery device sensory system 400' further comprises a fiber optic cable 410. The fiber optic cable 410 may extend between a first end 410A and a second end 410B. The first end 410A of the fiber optic cable 410 may be positioned proximate the infrared sensor 404 and the second end 410B of the fiber optic cable 410 may be positioned proximate a component of the aerosol delivery device 100 for which measurement of the infrared radiation emitting therefrom is desired. The infrared radiation may enter the fiber optic cable 410 at the second end 410B and travel therethrough, substantially without loss, to the infrared sensor 404. Note that although the fiber optic cable 410 is shown as extending through the throughhole 316A defined in the mouthpiece 316, it should be understood that the fiber optic cable 410 may not fully block the throughole so as to not impede the exit of aerosol therethrough, or the fiber optic cable may extend through a differing aperture.

In this regard, as illustrated in FIG. 6A, the fiber optic cable 410 may comprise one or more optical fibers 412. Each optical fiber 412 may comprise a core 412A and a cladding layer 412B, as shown in FIG. 6B. Due to a difference in the refractive index between the core and the cladding layer, total internal reflection may occur within each optical fiber 412 such that there is substantially no loss of infrared radiation therethrough as noted above. Further, in some embodiments the fiber optic cable 410 may further include a shield layer 414 configured to substantially prevent infrared radiation from entering the fiber optic cable at locations other than the second end 410B (see, FIG. 5). Thereby, the infrared sensor 404 (see, FIG. 5) may receive substantially the same amount of infrared radiation as the infrared sensor would if it were placed in direct proximity to the component without usage of the fiber optic cable 410 to ensure an accurate reading thereof.

In the embodiment of the aerosol delivery device sensory system 400' illustrated in FIG. 5, the first end 410A of the fiber optic cable 410 directly engages the sensor aperture 406 of the infrared sensor 404. However, as illustrated in FIG. 7, in another embodiment, the temperature testing unit 402 of the aerosol delivery device sensory system 400" may further include a shielding device 416. The shielding device 416 may be coupled to the infrared sensor 404. In this regard, the shielding device 416 may extend about the sensor aperture 406 defined by the infrared sensor 404. Further, the first end 410A of the fiber optic cable 410 may be coupled to the shielding device 416. The shielding device 416 may be substantially entirely enclosed when engaged with the first end 410A of the fiber optic cable 410 and the infrared sensor 404 to substantially prevent infrared radiation that has not traversed the fiber optic cable from entering the sensor aperture 406. The shielding device 416 may thus be employed to convert an infrared sensor 404 not configured for usage with the fiber optic cable 410 for usage therewith. Further, the shielding device 416 may be employed to allow use of the infrared sensor 404 with various fiber optic cables 410 having differing sizes and/or shapes by providing each shielding device with an appropriately sized aperture configured to receive the first end 410A of the fiber optic cable. As such, the shielding device 416 may be characterized as being a size and/or shape adapter.

Accordingly, the infrared sensor 404 may be employed to detect the infrared radiation emitted from one or more components of the aerosol delivery device 100. As described above, although the infrared sensor 404 may be configured to receive infrared radiation directly, in other embodiments the fiber optic cable 410 may be employed to receive and direct the infrared radiation to the infrared sensor. Usage of the fiber optic cable 410 may provide benefits in terms of allowing for access to various components within the aerosol delivery device 100 that may not otherwise be accessible or which may only be accessible via modification of the aerosol delivery device, which may be irreversible, which may impact sensor readings, and/or which may prevent testing of other components. Further, usage of the fiber optic cable 410 may allow for precise control over the target from which infrared radiation is received. In this regard, the fiber optic cable 410 may be specifically aimed at a single component or portion thereof by placing the second end 410B thereof in proximity to the component such that the radiation received by the infrared sensor 404 may be emitted from substantially only that one component or portion thereof, in order to provide a more accurate reading. In contrast, usage of the infrared sensor 404 without the fiber optic cable 410 may allow receipt of some infrared radiation from other components or sources which may impact the accuracy of the reading provided by the infrared sensor. Note, however, that if it is desired to obtain a temperature reading of a more broad area (e.g., the area around the atomizer), rather than a particular point, in some embodiments the fiber optic cable 410 and/or the infrared sensor 404 may be configured to receive infrared radiation from such broader areas, for example through usage of a lens. In this regard, by way of example it may be useful to know the temperature of the area surrounding the atomizer which, in view of the rapid heating and cooling of the atomizer, may define a peak temperature significantly less than a peak temperature of the atomizer. In this regard, the conditions at this area around the atomizer may be monitored to ensure that the temperature remains below a desired safety threshold.

Thereby, infrared radiation may be received from the one or more components such that, for example, a temperature of the component may be determined by the controller 408. For example, as illustrated in FIG. 4, the sensor aperture 406 may be aimed at the atomizer 410 or, as illustrated in FIGS. 5 and 7, the second end 410B of the fiber optic cable 410 may be positioned proximate the atomizer 310 in order to detect the infrared radiation emitted therefrom. Thereby, the infrared sensor 404 may measure infrared radiation received from the atomizer 310. In this regard, it may be desirable to acquire and record information regarding the temperature of the atomizer 310 during operation thereof such that operation of the atomizer may be improved. For example, heating the atomizer 310 to an insufficient extent may result in the production of less aerosol than desired. Conversely, production of too much heat at the atomizer 310 may waste electrical current, thereby unnecessarily rapidly depleting the electrical power source 216 (see, FIG. 2). Further, production of too much heat could damage components of the aerosol delivery device 100 and/or cause other problems. Additionally, the rate at which the atomizer 310 heats and cools may be monitored such that aerosol is produced for a desired duration with each puff. Further, too much heat may degrade the aerosol precursor composition and/or the aerosol produced and/or detrimentally affect the taste thereof. As such, monitoring the atomizer 310 may be employed to ensure that the atomizer 310 produces a desired amount of heat and heats/cools at a desired rate.

Thus, as described above, the infrared sensor 404 may be included in the temperature testing unit 402 as an external device that is separate from the aerosol delivery device 100 which may be employed to analyze the operation thereof. Accordingly, the temperature testing unit 402 may be employed to analyze the operation of the aerosol delivery device 100 for purposes such as research and development and quality control of manufactured aerosol delivery devices. Thereby, for example, the controller 212 (see, FIG. 2) may be programmed with a heating profile configured to cause the atomizer 310 to produce a desired amount of heat based on the infrared radiation received by the infrared sensor during testing. However, variations in individual components of aerosol delivery devices, ambient conditions, the remaining charge in the electrical power source 216 (see, FIG. 2) and/or various other factors may cause the actual heat produced by the atomizer 310 to differ from the heat monitored in a laboratory environment.

As such, FIG. 8 illustrates an aerosol delivery device sensory system 500 according to an additional embodiment of the present disclosure. As illustrated, in one embodiment the aerosol delivery device sensory system 500 may comprise an aerosol delivery device, which may include some or all of the components of the aerosol delivery device 100 described above. For example, the aerosol delivery device sensory system 500 may include the cartridge 300 and the control body 200. As illustrated, the control body 200 may include the controller 212 and the electrical power source 216. The cartridge 300 may include the atomizer 310 received in the outer body 314.

Further, the cartridge 300 may include the infrared sensor 404 received in the outer body 314. Thereby, the infrared sensor may measure infrared radiation received from a component within the aerosol delivery device sensory system 500. For example, the infrared sensor 404 may be configured to measure infrared radiation from a component within the cartridge 300. By way of further example, the infrared sensor 404 may be configured to measure infrared radiation produced by, and received from, the atomizer 310.

As illustrated in FIG. 8, in some embodiments the infrared sensor 404 may be positioned such that the sensor aperture 406 directly faces the component for which a measurement of the infrared radiation emitting therefrom is desired, such as the atomizer 310. However, in other embodiments the configuration of the components within the cartridge 300 may not allow the sensor aperture 406 to directly face the component for which a measurement of the infrared radiation emitting therefrom is desired.

By way of example, FIG. 9 illustrates an embodiment of the aerosol delivery device sensory system 500' wherein an additional component of the cartridge 300, and in particular the reservoir 312 in the illustrated example embodiment, is positioned between the infrared sensor 404 and the atomizer 310. Thereby, the sensor aperture 406 may not directly face the atomizer 310 so as to receive infrared radiation therefrom. However, the aerosol delivery device sensory system 500' may further include the fiber optic cable 410. Thereby, the first end 410A of the fiber optic cable may be positioned proximate the infrared sensor 404 and a second end 410B positioned proximate the atomizer 310. Accordingly, the fiber optic cable 410 may be positioned as may be appropriate such that the second end 410B faces a component for which detection of the infrared radiation emitting therefrom is desired. In this regard, the flexibility and relatively small cross-sectional dimensions of the fiber optic cable 410 may allow for sensing by the infrared sensor 404 of some or all of the components of the cartridge 300 regardless of the relative placement thereof within the outer body 314. In one embodiment the fiber optic cable 410 may define a diameter from about 0.25 mm to about 10 mm.

Regardless of whether or not the sensor aperture 406 directly faces the atomizer 310 or the infrared radiation is directed to the infrared sensor 404 via the fiber optic cable 410, information received from the infrared sensor may be employed to control operation of the atomizer 310. In this regard, the controller 212 may receive a signal from the infrared sensor 404 corresponding to the infrared radiation received. The signal may be received by the controller 212 directly from the infrared sensor 404 or via the electronic component 306. Providing the signal from the infrared sensor 404 to the controller 212 via the electronic component 306 may simplify the connection between the cartridge 300 and the control body 200 by not requiring usage of an additional connector. In this regard, the signal may be transmitted via the electronic component terminal 304 (see, FIG. 3).

Thereby, the controller 212 may control the supply of electrical current to the atomizer 310 from the electrical power source 216 in response to the signal from the infrared sensor 404. For example, the controller 212 may increase or decrease the supply of electrical current to the atomizer 310 in response to the signal from the infrared sensor 404. By way of further example, when a signal from the infrared sensor 404 corresponds to the atomizer 310 emitting a predefined quantity of infrared radiation, and thereby corresponds to the atomizer reaching a predefined temperature, the supply of electrical current to the atomizer may be decreased or stopped.

Thereby, issues with respect to under- or over-supply of electrical current to the atomizer 310 may be avoided. In this regard, the supply of electrical current to the atomizer 310 may be adjusted substantially in real-time in response to the signal from the infrared sensor 404. Thus, the supply of electrical current to the atomizer 310 may be adjusted, substantially in real-time, in response the temperature of the atomizer, in view of the signal from the infrared sensor 404 corresponding to the temperature of the atomizer.

Note that in the embodiment of aerosol delivery device sensory system 500' shown in FIG. 9, the fiber optic cable 410 engages the sensor aperture 406 directly. However, as may be understood, in other embodiments a shielding device may engage both the infrared sensor and the fiber optic cable as described above with respect to FIG. 7.

In an additional aspect a method for vapor production with an aerosol delivery device is provided. As illustrated in FIG. 10, the method may include providing an outer body and an atomizer comprising a heating element at operation 602. The atomizer may be received in the outer body. Further, the method may include providing an infrared sensor at operation 604. Further, the method may include measuring infrared radiation produced by the atomizer with the infrared sensor at operation 606.

The method may further include positioning a first end of a fiber optic cable proximate the infrared sensor. Additionally, the method may include positioning a second end of the fiber optic cable proximate the atomizer. Measuring infrared radiation produced by the atomizer with the infrared sensor at operation 606 may include measuring infrared radiation received from the atomizer through the fiber optic cable.

The method may additionally include coupling a shielding device to the sensor assembly such that the shielding device extends about a sensor aperture defined by the infrared sensor. Further, the method may include coupling the shielding device to the first end of the fiber optic cable. Coupling the shielding device to the sensor assembly and the first end of the fiber optic cable may include substantially entirely enclosing the shielding device to substantially prevent infrared radiation from entering the sensor aperture that has not traversed the fiber optic cable.

Further, the method may include substantially preventing infrared radiation from entering the fiber optic cable at locations other than the second end with a shield layer. Additionally, the method may include positioning the infrared sensor in the outer body. Measuring infrared radiation produced by the atomizer with the infrared sensor at operation 606 may include controlling electrical current supplied to the atomizer in response to a signal from the infrared sensor.

The method may further include providing a controller. Controlling electrical current supplied to the atomizer in response to the signal from the infrared sensor may include controlling the electrical current supplied to the atomizer with the controller. The method may additionally include positioning the infrared sensor outside of the outer body. Further, positioning a second end of the fiber optic cable proximate the atomizer may include inserting the fiber optic cable into the outer body.

As described above, infrared radiation emitted from components of aerosol delivery devices may be detected with an infrared sensor which may be internal or external to the aerosol delivery device for control or testing purposes, respectively. Such components from which the emitted radiation is sensed may be internal to an outer body of the aerosol delivery device. It should be understood from the present disclosure that the references to the components as being within an outer body of a cartridge or a control body of an aerosol delivery device are for example purposes only. In other embodiments the aerosol delivery device may include a single outer body. Thus, generically speaking, the infrared sensor may sense infrared radiation received from components within an outer body of the delivery device.

The present disclosure generally describes measuring infrared radiation emitted from the atomizer, as opposed to from other components of the aerosol delivery device heated by the atomizer. In other words, the present disclosure generally describes measuring infrared radiation directly emitted by the atomizer. In some embodiments the infrared sensor may be particularly configured to receive the infrared radiation from a portion of the atomizer, such as the heating element or the liquid transport element by particularly aiming the infrared sensor or the fiber optic cable at such portion of the atomizer. Measuring the infrared radiation emitted from the liquid transport element may provide a more accurate reading regarding the temperature conditions the aerosol precursor composition is subjected to, whereas measuring the infrared radiation emitted from the heating element may provide information regarding what is generally the highest temperature component within the aerosol delivery device such that a desired maximum temperature thereof is not exceeded.

However, in other embodiments infrared radiation emitted by any of the other components of the aerosol delivery device may be measured by the infrared sensor. Thereby, for example, it may be ensured that operation of the aerosol delivery device does not surpass a temperature threshold for one or more components thereof at which such components may be damaged. By way of further example, the infrared sensor may detect the temperature of a component of the aerosol delivery device that is externally accessible (e.g., the outer body of the cartridge) in order to limit the temperature of the components of the aerosol delivery device that may be contacted by a user.

Note that although embodiments of the present disclosure generally describe the fiber optic cable as defining a round cross-section, in other embodiments the fiber optic cable may define a cross-section having a different shape such as rectangular. In this regard, the cross-section of the fiber-optic cable may be particularly tailored to match orifices or spaces in aerosol delivery devices having alternative shapes.

In another embodiment multiple infrared sensors may be employed to simultaneously measure infrared radiation received from multiple locations on and/or components of an aerosol delivery device. In this regard, each infrared sensor may be aimed at a different component or a different portion of a component. As may be understood, in some embodiments one or more of the multiple infrared sensors may be engaged with a fiber optic cable in order to receive infrared radiation from locations that may be hard to directly measure the radiation emitting therefrom. Thus, multiple fiber optic cables may be employed in some embodiments, wherein each fiber optic cable terminates at a different infrared sensor and at a different location within the aerosol delivery device, or multiple fiber optic cables may be connected to a single infrared sensor.

Although the present disclosure is generally directed to using the systems disclosed herein to measure infrared radiation emitting from components of an aerosol delivery device, in other embodiments the systems disclosed herein may be employed to measure infrared radiation emitting from any other device. In this regard, usage of the fiber optic cable may be particularly advantageous in any apparatus wherein tight tolerances and/or substantially continuous outer bodies prevent direct access to components therein.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed herein and that modifications and other aspects are intended to be included within the scope of the appended claims. Although specific terms are employed herein, they are used in a generic and descriptive sense only and not for purposes of limitation.

That which is claimed:

1. An aerosol delivery device sensory system, comprising:
   an outer body;
   an atomizer comprising a heating element and received in the outer body;
   an infrared sensor positioned outside of the outer body, and configured to measure infrared radiation produced by the atomizer; and
   a fiber optic cable having a first end positioned proximate the infrared sensor and a second end positioned proximate the atomizer,
   the infrared sensor being configured to measure infrared radiation received from the atomizer through the fiber optic cable.

2. The aerosol delivery device sensory system of claim 1, further comprising a shielding device coupled to the infrared sensor and extending about a sensor aperture defined by the infrared sensor,
   wherein the first end of the fiber optic cable is coupled to the shielding device.

3. The aerosol delivery device sensory system of claim 2, wherein the shielding device is substantially entirely enclosed when engaged with the first end of the fiber optic cable and the infrared sensor to substantially prevent infrared radiation that has not traversed the fiber optic cable from entering the sensor aperture.

4. The aerosol delivery device sensory system of claim 3, wherein the fiber optic cable includes a shield layer configured to substantially prevent infrared radiation from entering the fiber optic cable at locations other than the second end.

5. The aerosol delivery device sensory system of claim 1, further comprising a controller programmed with a heating profile configured to cause the atomizer to produce an amount of heat based on the infrared radiation measured by the infrared sensor.

6. The aerosol delivery device sensory system of claim 1, comprising a temperature testing unit including the infrared sensor and the fiber optic cable, and an aerosol delivery device including the outer body and the atomizer.

7. An aerosol delivery device temperature monitoring method, comprising:
   providing an outer body and an atomizer comprising a heating element, the atomizer being received in the outer body;
   providing an infrared sensor positioned outside of the outer body; and
   positioning a first end of a fiber optic cable proximate the infrared sensor;
   positioning a second end of the fiber optic cable proximate the atomizer; and
   measuring infrared radiation produced by the atomizer with the infrared sensor, the infrared radiation received from the atomizer through the fiber optic cable.

8. The aerosol delivery device temperature monitoring claim 7, further comprising:
   coupling a shielding device to the sensor assembly such that the shielding device extends about a sensor aperture defined by the infrared sensor; and
   coupling the shielding device to the first end of the fiber optic cable.

9. The aerosol delivery device temperature monitoring method of claim 8, wherein coupling the shielding device to the sensor assembly and the first end of the fiber optic cable comprises substantially entirely enclosing the shielding device to substantially prevent infrared radiation from entering the sensor aperture that has not traversed the fiber optic cable.

10. The aerosol delivery device temperature monitoring method of claim 9, further comprising substantially preventing infrared radiation from entering the fiber optic cable at locations other than the second end with a shield layer.

11. The aerosol delivery device temperature monitoring method of claim 7, further comprising programming a controller with a heating profile configured to cause the atomizer to produce an amount of heat based on the infrared radiation measured by the infrared sensor.

12. The aerosol delivery device temperature monitoring claim 7, wherein positioning a second end of the fiber optic cable proximate the atomizer comprises inserting the fiber optic cable into the outer body.

* * * * *

UNITED STATES PATENT AND TRADEMARK OFFICE
CERTIFICATE OF CORRECTION

PATENT NO. : 11,013,266 B2
APPLICATION NO. : 15/374220
DATED : May 25, 2021
INVENTOR(S) : Alfred Bless et al.

Page 1 of 1

It is certified that error appears in the above-identified patent and that said Letters Patent is hereby corrected as shown below:

In the Claims

In Column 20, Claim 8, Line 31, "monitoring claim 7" should read -- monitoring method of claim 7 --

In Column 20, Claim 12, Line 54, "monitoring claim 7" should read -- monitoring method of claim 7 --

Signed and Sealed this
Seventh Day of September, 2021

Drew Hirshfeld
*Performing the Functions and Duties of the
Under Secretary of Commerce for Intellectual Property and
Director of the United States Patent and Trademark Office*